Sept. 20, 1966 D. GRAY 3,274,335

FACSIMILE AUTOMATIC BACKGROUND CONTROL

Filed July 8, 1963 2 Sheets-Sheet 1

INVENTOR
Dudley Gray

By William J. Newman
Attorney

FACSIMILE AUTOMATIC BACKGROUND CONTROL

Filed July 8, 1963 2 Sheets-Sheet 2

INVENTOR
Dudley Gray

By William J. Newman
Attorney

United States Patent Office 3,274,335

Patented Sept. 20, 1966

3,274,335
FACSIMILE AUTOMATIC BACKGROUND CONTROL

Dudley Gray, Chicago, Ill., assignor to Stewart-Warner Corporation, Chicago, Ill., a corporation of Virginia Filed July 8, 1963, Ser. No. 293,429
17 Claims. (Cl. 178—7.1)

Figure 1:
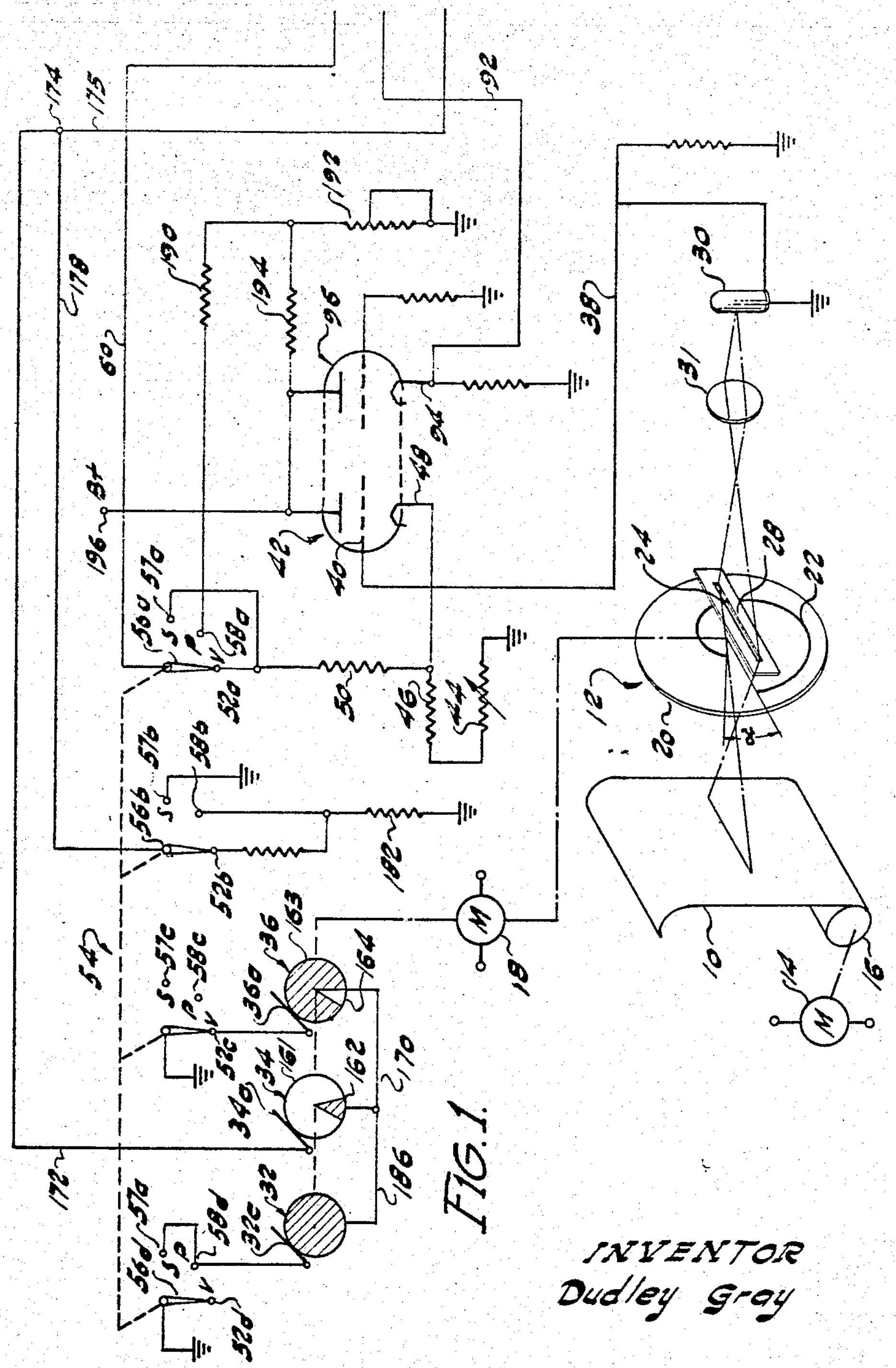

This invention relates to facsimile systems and more particularly to the transmission of signals which are automatically controlled to provide optimum reproduction of copy.

In one type of facsimile system graphic copy is scanned line by line by suitable optical means and light reflected therefrom is focused on a photocell or phototube to generate electrical signals corresponding to the intensity of light. The electrical signals are caused to modulate a subcarrier signal in a modulator which subcarrier signal is caused to modulate a radio transmitter or is directly transmitted by wire. The electrical signals are thus received at a remote location and after proper amplification and other treatment reproduced on an electrolytic recording paper. They are reproduced in the same predetermined sequence in which they were picked up and in terms of corresponding densities to provide a recorded facsimile copy.

Facsimile systems are called upon to reproduce copy which appears on a variety of shades and types of paper which materially affect the baskground shade of the reproduction. For example, in a system which reproduces copy in black, white and varying shades of gray, the reproduction of typewritten copy on white paper would appear as black copy on a white background at the receiver. If, however, the scanned copy is black typewritten on perhaps yellow or green paper the background of the reproduction at the receiver will be a shade of gray with the copy black. The finish of the scanned paper will also have a material effect on the reproduction in that glossy paper will produce a significantly different background signal than a dull finished paper. A scanned white portion on glossy paper may appear as white in the reproduction but for the same setting of the system a scanned white on dull finished paper would produce a grayish background at the receiver.

It is desirable that the facsimile adjust itself to optimize the reproduction of copy by providing black marks and varying shades of gray in accordance with the density gradient of the copy scanned on a white background irrespective of the color, shade or type of paper on which the scanned copy appears. According to this invention the copy is scanned in a manner to produce electrical signals in the output of photoelectric means which in turn are caused to modulate a subcarrier frequency signal so as to have an amplitude gradient ranging from zero to a maximum level corresponding to a copy density gradient ranging from black to white, respectively. The modulated subcarrier frequency signal is added to a constant amplitude oppositely phased subcarrier frequency signal so that the summation resultant will be modulated to have an amplitude gradient ranging from white to black respectively. That is, a signal from the modulator corresponding to white on the scanned material will be counterbalanced by the constant amplitude subcarrier frequency signal resulting in zero output of the transmitter. However, when black portion of the copy is being scanned the output of the modulator is zero which causes no reduction in the constant amplitude subcarrier frequency signal and the output of the transmitter is maximum for black copy. To provide the automatic background control the output from the modulator is subjected to a variable gain amplifier whose gain is varied inversely with the level of the maximum voltage peaks from the modulator output.

Thus, if the maximum peaks of the modulator output which are representative of the lightest density copy of the copy material being scanned are particularly low, the variable gain amplifier will cause them to be boosted to a level representative of white.

It is, therefore, an object of this invention to provide an improved facsimile system and more particularly an improved facsimile transmitter therefor.

It is another object of this invention to provide a facsimile system in which the copy reproduction density gradient is optimized.

A further object of this invention is to provide a facsimile system in which the transmitted signals are automatically adjusted in accordance with changes in the shade and/or type of paper the copy to be reproduced appears.

It is another object of this invention to provide a facsimile system in which the background of the copy reproduction is maintained white or nearly so regardless of the color or the type of paper upon which the scanned copy appears.

Figures 2, 3:
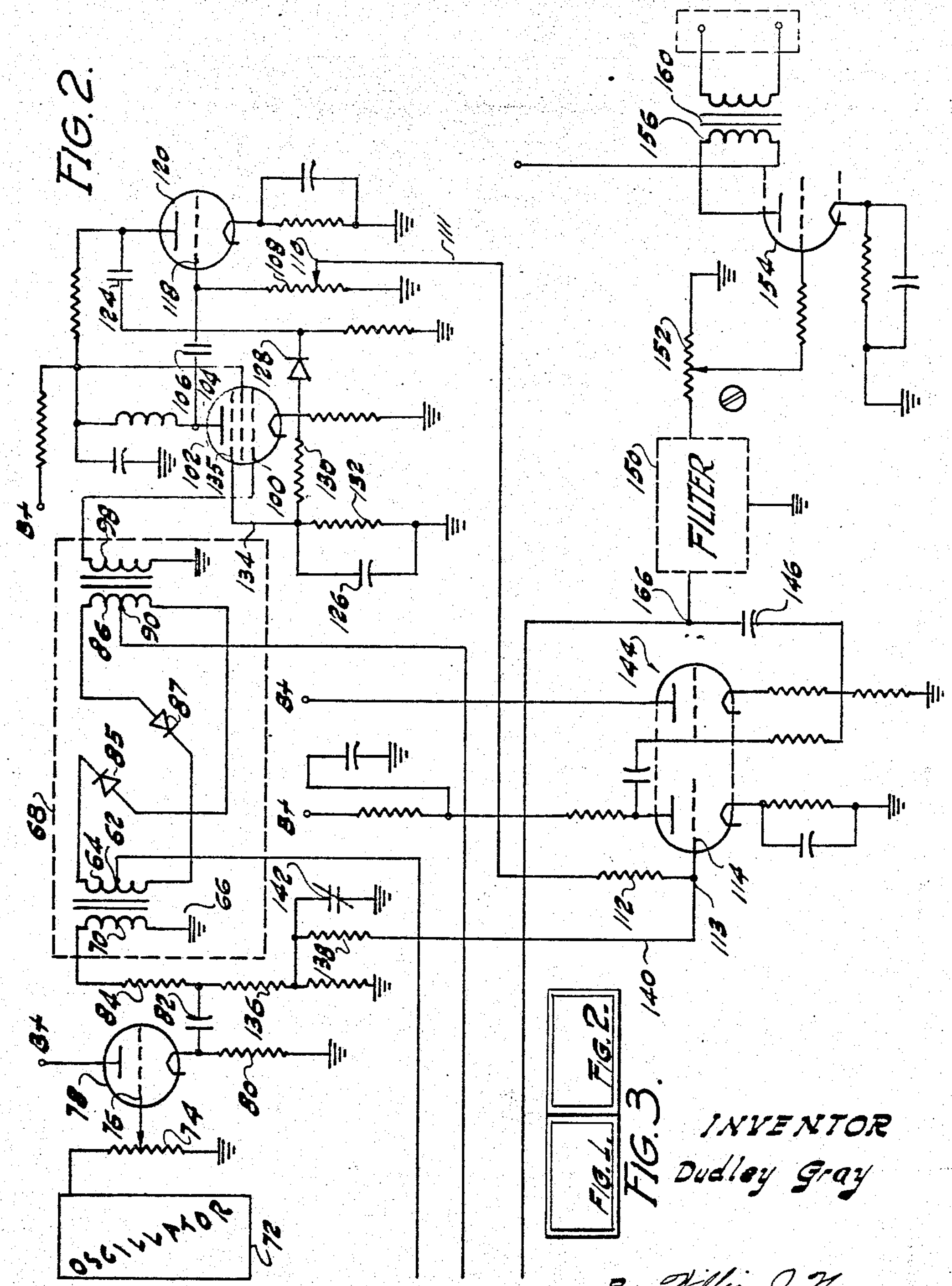

Other objects and advantages of this invention will be readily apparent upon further reading of this specification, especially when taken in view of the accompanying drawings, in which:

FIGS. 1 and 2 are a schematic diagram of a facsimile transmitter embodying the teachings of this invention and are to be combined as shown in the diagram of FIG. 3.

In FIG. 1 a sheet 10 marked with graphic copy is slowly passed in view of a scanning mechanism 12 by means of a motor 14 and copyfeed roller 16. The copyfeed motor 14 is caused to be energized a predetermined delayed time interval after copy containing sheet 10 is inserted into the transmitter in a manner well known to the facsimile art and not forming part of this invention, and the predetermined delay time interval represents the phasing period of the system during which the facsimile receiver is synchronized with the transmitter.

A synchronous motor 18 drives the scanning means 12 which may comprise an opaque disk 20 having a spiral slit 22 therein. The spiral slit 22 cooperates with a linear slit 24 in a stationery opaque member 26 to provide a linearly moving opening 28 by which a photocell 30 may view the copy on the sheet 10 through optical means including the lens 31. The opening 28 linearly scans the sheet and causes variations in the reflected light passed to the photoelectric means 30 as it encounters variations in color density in the copy on the sheet. The motor 18 also drives three commutator disks 32, 34 and 36, the purpose of which will be hereinafter described.

The photoelectric means 30 may be a photomultiplier tube or a semi-conductor type photocell which produces electrical signals at its output, the amplitudes of which are representative of the density of the copy being scanned. The output of the photoelectric means 30 is connected by means of line 38 to grid 40 of cathode follower buffer amplifier 42. The output of the buffer amplifier 42 is taken across resistors 44 and 46 connecting the cathode 48 to ground and is transmitted by way of resistor 50 to stationary contact *52a* of a multibank or ganged switch 54.

The multibank or gang switch 54 includes movable contact arms *56a, b, c* and *d* which are engageable with the stationary contacts *52a* through *d*, *57a* through *d*, and *58a* through *d*, representing its positions when the transmitter is in the video mode, phasing mode, and standby mode, respectively. The multibank switch 54 may be either manually operated or it may be an automatically operated stepping switch which is sequenced from its standby position to its phase and video positions by means (not shown) triggered by the feeding of the copy 10 into the transmitter as hereinbefore mentioned. If the automatic-type switch is used the arms *56a* through *d* are stepped from their standby positions to the phasing positions by the insertion of the copy containing the sheet into the transmitter. The sequence means (not shown) steps the arms 56*a* through *d* into the video position after a predetermined time interval representative of the phasing period for synchronizing the receiver to the transmitter. The present invention is concerned primarily with the operating of the transmitter in the video mode and hence the switches are shown in that position. However, a brief description of the phasing operation will be given later in the specification.

Continuing now with the tracing of the copy or video signals from the contact 52*a* of multi-bank switch 54 through the transmitter, it will be noted that the switch arm **56*a* is connected by line 60 to the center tap 62 of the secondary 64 of transformer 66 (FIG. 2). The transformer secondary center tap 62 forms the video signal input to a modulator 68 in which light variation voltage signals developed by the scanner 12 and the photoelectric means 30 amplitude modulate a subcarrier frequency signal. The subcarrier signal is introduced by means of the primary 70 of the transformer 66 to provide a double side band plus carrier signal at the modulator output. The subcarrier frequency signal is generated in oscillator 72 which may be of any well known type and its output is sent through a potentiometer 74 to grid 76 of a buffer amplifier 78. The buffer amplifier 78 is of the cathode follower type with the output taken across the cathode resistor 80 and fed through blocking capacitor 82 and resistor 84 to the primary 70 of transformer 66**.

The modulator 66 has a pair of diodes 85 and 87 interconnecting the secondary 64 of the transformer 66 with the primary 86 of a second transformer 88. The center cap 90 provides the input for a reference voltage supplied thereto by means of line 92 from the cathode 94 of a modulation reference voltage amplifier 96. It may, therefore, be seen that the difference between the voltage at cathode 94 of reference voltage amplifier 96 and the signal voltage at the cathode 48 of the buffer amplifier 42 provides the modulation in the balanced modulator 68. For example, if the voltage on cathode 48 of the buffer amplifier 42 is more positive than the voltage at cathode 94 of the reference voltage amplifier 96, the diodes 85 and 87 are back-biased and prevent the subcarrier frequency signal from passing from the secondary of transformer 66 to the primary of transformer 88. However, if the voltage at cathode 48 is negative with respect to the voltage at cathode 94 the diodes are forward biased and permit subcarrier frequency signal to pass therethrough at an amplitude proportional to the signal difference between the center taps. If the voltages at the cathodes 48 and 94, respectively, are exactly balanced, there will be no subcarrier frequency signal permitted to pass through the modulator 68.

The photoelectric means 30 is adapted to provide a negative going signal at its output responsive to its exposure to light portions on the sheet 10 and to provide no voltage signal when exposed to black portions of copy. The negatively directed voltage variations appearing at the center tap 62 in the modulator 68 which are applied from the output of the photoelectric means 30, amplitude modulate the subcarrier frequency passing therethrough so as to have an amplitude gradient ranging from zero to a maximum level corresponding to a copy density gradient on the sheet 10 ranging from black to white, respectively. That is, black copy produces no signal at cathode 48 so that a voltage appears at center tap 62 which is equal to the voltage at center tap 90, thus permitting no subcarrier frequency signal to pass through. While portions of the sheet 10 cause a maximum negative signal at the grid 40 of the triode 42 and hence a maximum difference voltage between center taps 62 and 90 to provide a maximum amplitude subcarrier frequency to be passed. Intermediate shades of gray produce intermediate voltage differences between the two center taps and thus pass intermediate amplitude subcarrier frequency voltage signals.

The output of the modulator 68 is taken across the secondary 98 of transformer 88 and applied to the control grid 100 of a pentode 102 having a high suppressor-grid transconductance. The output from the plate 104 of pentode 102 is transmitted through a blocking capacitor 106 to the ungrounded end of a potentiometer 108 and from the movable arm 110 of the potentiometer through line 111, resistor 112 and junction 113 to grid 114 of a triode amplifier 116.

The output from the pentode 102 is also fed to the grid 118 of an amplifier 120. A peaking circuit 122 is coupled to the output of the amplifier 120 through a capacitor 124 and comprises a capacitor 126 which is charged by negative going portions of the amplitude modulated subcarrier signals passing through diode 128 and resistor 130. The capacitor 126 has a substantially large capacitance in the order of 2 to 5 microfarads and the discharge resistor 132 connected therearound is also of a large value of in the order of 1 megohm. Thus, the time constant is equal to the scanning time of several lines and the voltage across the capacitor 126 is maintained at a level determined by the maximum peak voltages at the plate of the pentode 102. The voltage across the capacitor 126 is applied by line 134 to the suppressor grid 135 of the pentode and serves to adjust the gain through the tube in accordance with the maximum peak voltages at its plate output. That is, if the maximum peaks (which it will be remembered are associated with maximum white portions on the scanned material) begin to fall, the voltage across the capacitor 126 will be reduced and, hence, increase the gain of the pentode 102. It will thus tend to maintain the product of the voltage at grid 100 and the gain of pentode 102 constant with variations at the grid. The output of the pentode and, hence, the signal at junction 113 are automatically controlled so that the maximum peak voltages are always representative of a white scanned portion regardless of the color density actually scanned.

There is also supplied to the junction 113 a constant amplitude subcarrier frequency signal which is derived from the output of the oscillator buffer amplifier 78 through resistor 136, resistor 138 and conductor 140. The subcarrier frequency signal in this circuit is adjusted by variable capacitor 142 to be exactly opposite in phase from the carrier signal component arriving at point 113 through the modulator circuit.

The resultant of the summation of the two oppositely phased signals at junction 113 is an amplitude modulated signal of the subcarrier frequency whose amplitude varies from minimum to maximum corresponding to a copy density gradient ranging from white to black, respectively, or just the opposite as the variations at the output of the pentode 102. If the setting of the potentiometer 110 is properly chosen the resultant at junction 113 will be zero signal when the scanner 12 is viewing the lightest portions of the copy on sheet 10. However, when black portions of copy are being viewed the modulator 68 will cut off the subcarrier frequency signal so that there is no signal from the output of pentode 102 at junction 113, the resultant being the constant amplitude signal arriving from conductor 140. Intermediate shades of color produce a resultant signal at 113 of the subcarrier frequency whose amplitude lies between zero and the maximum black signal in accordance with the copy density gradient.

Continuing the tracing of the signal from the junction 113, the triode 116 and cathode follower 144 treat the signal in the normal fashion and present it through blocking capacitor 146 to filter 150. The filter 150 is a side band filter for substantially removing one side band of the double side band and carrier resultant signal. The output of the filter 150 is routed through potentiometer 152, serving as a gain adjustment, to a conventional amplifier 154, and, hence, to the primary 156 of output transformer 160.

The output of the transformer 160 may be coupled directly to the input terminals of a facsimile receiver such as by transmission or telephone lines and the like. In the alternative, the output of the transformer may be used to modulate a radio frequency carrier signal and transmitted by electromagnetic waves to a distant receiver.

The facsimile signal developed by the transmitter contains a blanking and black pedestal signal at the end of each line sweep of the copy which is used to maintain the receiver in operation when the transmitter is scanning extended portions of white on the copy sheet 10. The signal also provides a standard reference for automatically controlling the gain of the facsimile receiver to record properly the scanned image. The blanking and black pedestal signal occurs during the period between the end of one line and the beginning of the next line represented by the angle alpha (FIG. 1) on the scanning disk 20 between the two ends of the spiral slit 22 in which no light is received at the photoelectric means 30. The modulator output supplied to the junction 113 is zero during this time but conductor 140 is supplying a constant amplitude subcarrier frequency signal to the junction 113 which is indicative of a black level. The keying commutators 32, 34, 36 interrupt this signal to provide the blanking pulse in the following manner.

The commutator rotates with the scanning disk 20 and are oriented with respect to their respective brushes 32*a*, 34*a* and 36*a* to sequentially short the transmitter signal to ground during the part of the cycle when the angular portion alpha of the scanning disk is blocking light to the photoelectric means 30. The keying commutator 34 has a substantially large nonconducting portion 161 and a small conducting portion 162 which is of approximately the same angle as the portion alpha on the scanning disk. The keying commutator 36 on the contrary has a substantially large conductive portion 163 and a small nonconductive portion 164 which is positionally oriented with respect to the angular portion 162 and commutator 134 to engage its brush 36*a* when the brush 34*a* is in engagement with the middle of the conductive portion 162 on commutator 34.

At the beginning of the blanking and black pedestal portion, alpha, the commutators 34 and 36 are positioned to provide ground to junction 166 (FIG. 2) at the input to the filter 150 through the circuit from ground (FIG. 1), arm 56*c* of the multibank switch 54, video mode contact 52*c*, brush 36*a*, conductive portion 163 of commutator 36, conductor 170, conducting portion 162 on commutator 34, brush 34*a*, conductor 172, junction 174 and line 176 to junction 166. The transmitter output is, therefore, zero which is representative of a white copy level. During the middle of the blanking and black pedestal signal portion the brush 36*a* engages the nonconducting portion 164 of the commutator 36 so that the junction 166 at the filter input is no longer connected directly to ground, but is connected to a fixed resistance as may be traced from line 176 to junction 174, line 178, arm 56*b* of the multibank switch 54, video mode contact 52*b*, resistor 180 and resistor 182 to ground. During this short interval the constant amplitude black signal is permitted to pass junction 166 to the transmitter output to supply the receiver with a black pedestal of predetermined amplitude.

When the nonconductive portion 164 of keying commutator 163 is past the brush 36*a*, the junction 166 is again connected directly to ground to cut off the black pedestal. It is to be noted that the balance modulator 68 plays no part in the development of the blanking and black pedestal signal. Therefore, no special keying gates to trigger the modulator 68 to produce a black pulse are required as is found in ordinary facsimile transmitters of this general design.

As hereinbefore mentioned, the facsimile receiver is synchronized with the transmitter by the transmission of periodic pulses at the beginning of the transmission. The pulses, which are created directly by means of the scanning motor 18, and the commutators 32, 34 and 36 in the transmitter are used to properly phase a motor in the receiver which drives the marking scanner so that the scanning disk 20 and the marking scanner will both begin a line at the same instant. When the transmitter is in the phasing mode, the multibank switch 54 has its arms 56*a* through *d* in engagement with the phasing contacts 58*a* through *d* and commutators 34 and 32 cause the periodic grounding and ungrounding of the junction 166 at the input to filter 150. This circuit may be traced from ground to the arm 56*d* of multibank switch 54, phasing mode contact 58*d*, conductor 184, brush 32*c*, completely conductive commutator 32, conductor 186, commutator 34, brush 34*a*, line 172, junction 174 and line 176 to junction 166.

The junction 166 is, therefore, grounded when conductive portion 162 of commutator 34 is in engagement with brush 34*a* and is ungrounded when the nonconductive portion 161 is engaged therewith. During the ungrounded portion the black pedestal signal at junction 113 is carried through the amplifiers 142 and 144 to junction 166 and onward to the transmitter output. Therefore, the phasing period comprises a periodically interrupted black level signal, the periodic interruptions serving as the pulses for phasing the helix drum motor in the receiver.

During the phasing mode the modulator 68 is biased to prevent the passage of subcarrier frequency signal therethrough so that light received by the photoelectric means to the scanner 12 has no effect. The center tap 62 of the secondary 64 of transformer 66 is maintained at a relatively high positive level through line 60, arm 56*a* of multi-bank switch 54, phasing mode contact 58*a*, resistor 190 and the voltage divider formed by resistors 192 and 194 between ground and the positive voltage supply 196. The diodes 85 and 87 in the modulator 68 are, therefore, back-biased to prevent any signal from passing and only the phasing signals appear at the output of the transmitter.

In the standby mode when switch 54 engages contacts 57*a* through *d* the junction 166 is maintained at ground to prevent the transmission of any signals. Ground is applied to the junction 166 from line 176, junction 174, line 178, are 56*d* of multi-bank switch 54, standby mode contact 57*b* and ground.

While there has been described a preferred embodiment of this invention, it will be readily understood by one skilled in the art that many modifications and additions may be made thereto without departing from the spirit and scope of the present invention. It is, therefore, intended to be bound only by the scope of the appended claims.

What is claimed is:

1. In a system for converting light variations into electric signals, the combination of a photoelectric device, means for directing light to be converted into said photoelectric device, a subcarrier-frequency signal source, a modulator circuit in which the output signals of said photoelectric device modulates the subcarrier-frequency signal, variable gain amplifying means for amplifying the modulated signal, means responsive to the maximum amplitude peaks of said amplifier output for inversely affecting the gain of said amplifying means, and means including said subcarrier signal source for summing the amplified modulated signal with a constant amplitude oppositely phased carrier-frequency signal, whereby the amplitude of the summation signal is indicative of said light variations.

2. In a system for converting light variations into electric signals, the combination of a photoelectric device, means for directing light to be converted into said photoelectric device, a subcarrier-frequency signal source, a modulator circuit in which the output signals of said photoelectric device modulates the subcarrier-frequency signal, variable gain amplifying means for amplifying the modulated signal, means responsive to the maximum amplitude peaks of said amplifier output for inversely affecting the gain of said amplifying means, and means for summing the amplified modulated signal with a constant amplitude oppositely phased carrier-frequency signal, whereby the amplitude of said resultant signal is indicative of said light variations.

3. In a system for converting light variations into electric signals, the combination of a photoelectric device, means for directing light to be converted into said photoelectric device, a subcarrier signal source, a modulator circuit in which the output signals of said photoelectric device modulates the subcarrier signal, means for amplifying the modulator output signal to maintain the maximum peaks thereof at a predetermined level, and means for summing the amplified modulated signal with an oppositely phased carrier-frequency signal having a constant amplitude of said predetermined level, whereby the amplitude of the resultant summation signal is indicative of said light variations.

4. In a facsimile system, a transmitter of the type producing a subcarrier-frequency signal output modulated to have an amplitude gradient ranging from zero to maximum corresponding to a marking gradient ranging from white to black, respectively, comprising a photoelectric device, means for directing light from copy to be reproduced into said photoelectric device, means for generating said subcarrier-frequency signal, a modulator circuit in which the output signal of said photoelectric device amplitude modulates said subcarrier-frequency signal to have an amplitude gradient ranging from zero to maximum corresponding to a copy density gradient ranging from black to white, respectively, a variable gain amplifier for amplifying the output of said modulator, means responsive to the peak amplitudes of the output of said amplifier for inversely affecting the gain of said amplifier, and means including said signal source for summing the amplified, modulated, subcarrier-frequency signal with an oppositely-phased subcarrier-frequency signal having an amplitude corresponding to a black mark, whereby the amplitude of the output signal of said transmitter is approximately zero responsive to the lightest density of the copy being reproduced.

5. The facsimile system of claim 4 wherein said transmitter includes means for periodically providing blanking and automatic gain control signals comprising a keying commutator for sequentially grounding, ungrounding and grounding the output of said summing means during a predetermined black portion of a copy scanning cycle.

6. In a facsimile system, a transmitter of the type producing a subcarrier-frequency signal output modulated to have an amplitude gradient ranging from zero to maximum corresponding to a marking gradient ranging from white to black, respectively, comprising a photoelectric device, means for directing light from copy to be reproduced into said photoelectric device, means for generating said subcarrier-frequency signal, a modulator circuit in which the output signal of said photoelectric device amplitude modulates said subcarrier-frequency signal to have an amplitude gradient ranging from zero to maximum corresponding to a copy density gradient ranging from black to white, respectively, a variable gain amplifier for amplifying the output of said modulator, means responsive to the peak amplitude of the output of said amplifier for inversely affecting the gain of said amplifier, and means for summing the amplified, modulated, subcarrier-frequency signal with an oppositely phased subcarrier frequency signal having an amplitude corresponding to a black mark, whereby the amplitude of the output signal of said transmitter is approximately zero responsive to the lightest density of the copy being reproduced.

7. The facsimile system of claim 6 wherein said transmitter includes means for periodically providing blanking and automatic gain control signals comprising a keying commutator for sequentially grounding, ungrounding and grounding the output of said summing means during a predetermined black portion of a copy scanning cycle.

8. A facsimile transmitter comprising means for generating an alternating reference signal having a constant amplitude representative of a dark mark, means providing an oppositely phased signal of equal frequency relative to said reference signal and modulated to have an amplitude gradient from a lower value to higher value corresponding to a density gradient from dark to light, respectively, of the copy scanned, means for maintaining the maximum amplitude portions thereof at a level approximately equal to the amplitude of said reference signal, and means for summing said signals, whereby the resultant summation signal is modulated to have an amplitude gradient varying from zero to the level of said constant amplitude corresponding to a copy density gradient ranging from light to dark, respectively.

9. A facsimile transmitter comprising means for generating an alternating reference signal having a constant amplitude representative of a dark mark, means providing an oppositely phased signal of equal frequency relative to said reference signal and modulated to have an amplitude gradient from a lower value to a higher value corresponding to a density gradient from dark to light, respectively, of the copy scanned, means including a variable gain amplifier for amplifying the output of said signal providing means and maintaining the maximum amplitude portions thereof at a level approximately equal to the amplitude of said reference signal, and means for summing said signals, whereby the resultant summation signal is modulated to have an amplitude gradient varying from zero to the level of said constant amplitude corresponding to a copy density gradient ranging from light to dark, respectively.

10. A facsimile transmitter comprising means for generating an alternating reference signal having a constant amplitude representative of a first density means providing an oppositely phase signal of equal frequency relative to said reference signal and modulated to have an amplitude gradient from a first value to a second value corresponding to a density gradient from said first density to a second density, respectively, of the copy scanned, means including a variable gain amplifier for maintaining portions of said oppositely phased signal at a value approximately equal to the amplitude of said reference signal, and means for summing said signals, whereby the resultant is modulated to have an amplitude gradient varying from zero to the level of said constant amplitude corresponding to a copy density gradient ranging from said second density to said first density.

11. A facsimile transmitter comprising means for generating an alternating reference signal having a constant amplitude representative of a black mark, means providing an oppositely phased signal of equal frequency relative to said reference signal and modulated to have an amplitude gradient from zero to maximum corresponding to a density gradient from black to white, respectively, of the copy scanned, means including a variable gain amplifier for amplifying the output of said signal providing means and maintaining the maximum amplitude portions thereof at a level approximately equal to the amplitude of said reference signal, and means for summing said signals, whereby the resultant summation signal for an amplitude gradient varying from zero to the level of said constant amplitude corresponding to a copy density gradient ranging from white to black, respectively.

12. The facsimile transmitter of claim 8 including in addition means for providing periodic blanking and automatic gain control signals comprising means for sequentially grounding and ungrounding the output of said summing means during a predetermined black portion of a copy scanning cycle.

13. In a facsimile system, a transmitter of the type producing a subcarrier frequency signal output modulated to have an amplitude gradient ranging from zero to maximum corresponding to a marking gradient ranging from light to dark, respectively, comprising a photoelectric device, means for directing light from copy to be reproduced into said photoelectric device, means for generating said subcarrier frequency signal, a modulator circuit in which the output signal of said photoelectric device amplitude modulates said subcarrier-frequency signal to have an amplitude gradient ranging from zero to maximum corresponding to a copy density gradient ranging from dark to light, respectively, a variable gain amplifier for amplifying the output of said modulator, means responsive to the peak amplitude of the output of said amplifier for inversely affecting the gain of said amplifier, and means including said signal source for summing the amplified, modulated, subcarrier-frequency signal with an oppositely phased subcarrier-frequency signal having an amplitude corresponding to a dark mark.

14. In a facsimile system, a transmitter comprising photoelectric means for producing electrical signals ranging from zero to maximum corresponding to a copy density gradient ranging from black to white, respectively, means for cyclically scanning the copy to direct light therefrom into said photoelectric means, an oscillator for generating a subcarrier-frequency signal, a modulator coupled to said oscillator and said photoelectric means for amplitude modulating the subcarrier-frequency signal to have an amplitude gradient ranging from zero to maximum corresponding to a copy density gradient ranging from black to white, respectively, a high suppressor-grid-transductance pentode having its control grid coupled to the output of said modulator, an amplifier coupled to the output of said pentode, a peaking circuit having a substantially long discharge time constant in comparison to a period of said cyclic scanning coupled to the output of said pentode for developing a negative D.C. voltage determinative by the maximum voltage peaks of the pentode output, means for applying said negative voltage to the suppressor grid of said pentode, means including said oscillator for adding to the amplifier output signal a constant amplitude subcarrier-frequency signal oppositely phased therefrom, and manually adjustable means in said amplifier means for varying the amplitude of its output about a level at which the maximum peak voltages thereof coincide with the constant amplitude level.

15. In a facsimile system, a transmitter comprising photoelectric means for producing electrical signals ranging from zero to maximum corresponding to a copy density gradient ranging from black to white, respectively, means for periodically scanning the copy to direct light therefrom into said photoelectric means, an oscillator for generating a subcarrier-frequency signal, a balanced modulator coupled to said oscillator and said photoelectric means for amplitude modulating the subcarrier-frequency signal to have an amplitude radiant ranging from zero to maximum corresponding to a copy density gradient ranging from black to white, respectively, a variable gain amplifier having its input coupled to the output of said modulator, a second amplifier coupled to the output of said variable gain amplifier, a peaking circuit having a substantially long discharge time constant in comparison to a period of said cyclic scanning coupled to the output of said variable gain amplifier for developing a D.C. voltage determinative by the maximum voltage peaks of the output signal, means for applying said D.C. voltage to said variable gain amplifier to inversely vary its gain, means including said oscillator for adding to the second amplifier output signal a constant amplitude subcarrier-frequency signal oppositely phased therefrom, and manually adjustable means for varying the amplitude of the second amplifier output about a level at which the maximum peak voltages thereof coincide with the constant amplitude level.

16. In a facsimile system, a transmitter comprising a photoelectric device, means for directing light from copy to be reproduced into said photoelectric device, an oscillator for generating a subcarrier-frequency signal, a balanced modulator coupled to said oscillator and said photoelectric device for amplitude modulating the subcarrier frequency signal with signals from said photoelectric device, a high suppressor-grid-transconductance pentode having its control grid coupled to the output of said modulator, a peaking circuit coupled to the output of said pentode for developing a negative D.C. voltage determinative by the maximum voltage peaks of the pentode output, means for applying said negative voltage to the suppressor-grid of said pentode, buffer means coupled to the output of said pentode, and means for adding to the buffer means output signal a subcarrier-frequency signal oppositely phased therefrom and having a constant amplitude approximately equal to the maximum voltage peaks of the buffer means output signal.

17. In a facsimile system, a transmitter comprising a photoelectric device, means for directing light from copy to be reproduced into said photoelectric device, an oscillator for generating a subcarrier-frequency signal, a balanced modulator coupled to said oscillator and said photoelectric device for amplitude modulating the subcarrier frequency signal with signals from said photoelectric device, a variable gain amplifier coupled to the output of said modulator, a peaking circuit coupled to the output of said pentode for developing a D.C. voltage determinative by the maximum voltage peaks of the pentode output, means for applying said voltage to said amplifier to inversely vary its gain buffer means coupled to the output of said amplifier, and means for adding to the buffer means output signal a subcarrier-frequency signal oppositely phased therefrom and having a constant amplitude approximately equal to the maximum voltage peaks of the buffer means output signal.

No references cited.

DAVID G. REDINBAUGH, *Primary Examiner.*

J. McHUGH, *Assistant Examiner.*